June 24, 1924.
V. MIKULECKY
MUD GRIP
Filed March 19, 1923     2 Sheets-Sheet 1
1,498,882
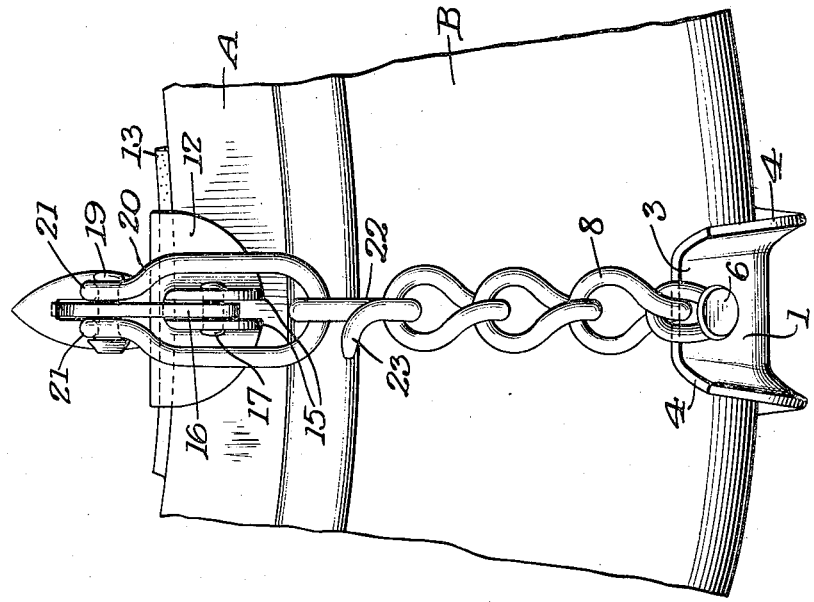
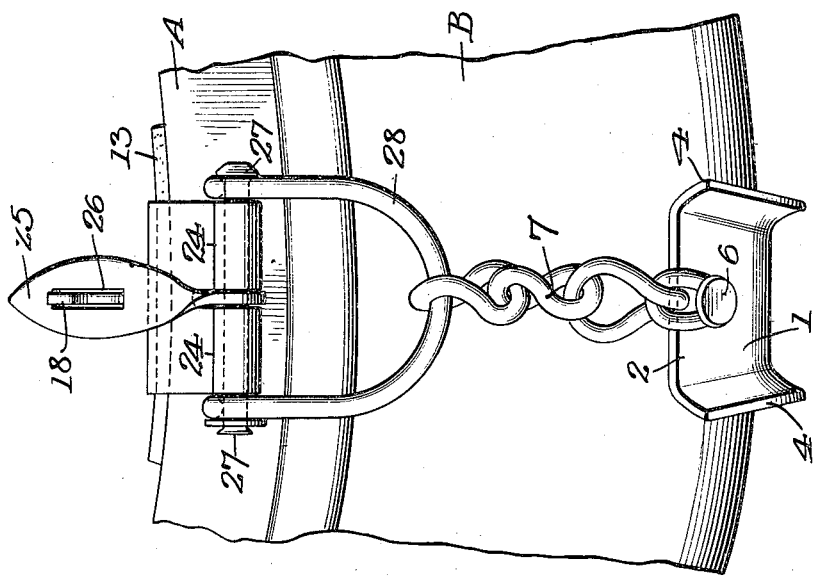
Inventor
Vaclav Mikulecky
by his Attorneys June 24, 1924.
V. MIKULECKY
MUD GRIP
Filed March 19, 1923 2 Sheets-Sheet 2
1,498,882
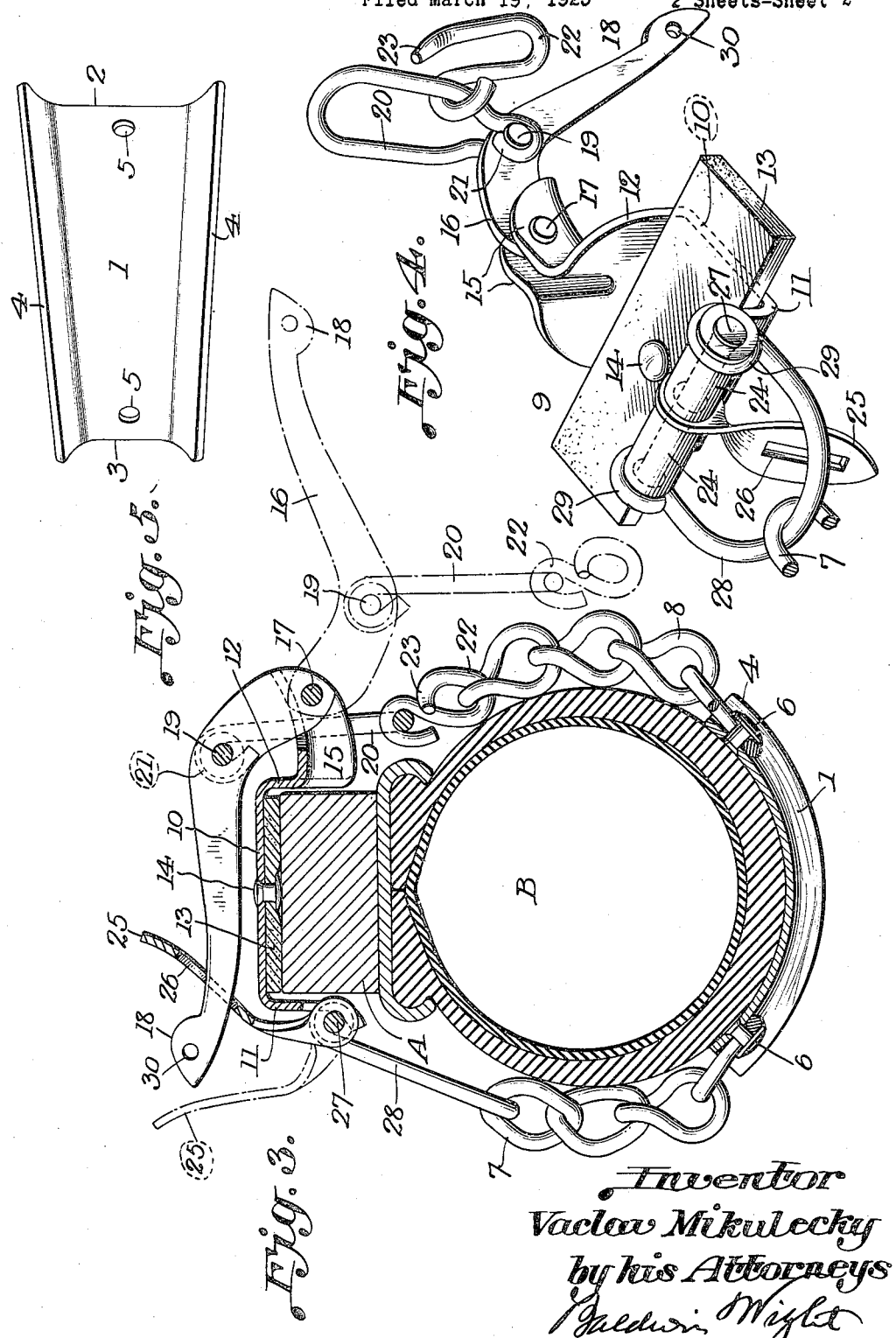
Inventor
Vaclav Mikulecky
by his Attorneys
Baldwin Wight Patented June 24, 1924.

1,498,882

UNITED STATES PATENT OFFICE.

VACLAV MIKULECKY, OF VERDIGRE, NEBRASKA.

MUD GRIP.

Application filed March 19, 1923. Serial No. 626,100.

*To all whom it may concern:*

Be it known that I, VACLAV MIKULECKY, a citizen of the United States, and resident of Verdigre, in the county of Knox and State of Nebraska, have invented certain new and useful Improvements in Mud Grips, of which the following is a specification.

This invention relates to mud grips adapted to be applied to the wheels of motor vehicles to enable them to avoid slipping in the mud or similar places, and is an improvement on the device shown in my Patent No. 1,375,716, granted April 26, 1921.

An object of the invention is to simplify the patented construction and make it more strong and durable. It is further easier to manufacture and more efficient in use.

Another object is the provision of a grip of improved form together with means connected thereto by which the device can be quickly attached to a wheel or detached therefrom.

Another object is to improve the clamping devices by which the grip is firmly attached to the wheel, said devices being simple and strong in construction and easily operated.

Other objects will be apparent from the following detailed description of the device and the appended claims.

In the drawings:

Figure 1 is a side elevation of the device when applied to a wheel, said view being taken from one side.

Figure 2 is a similar side elevation taken from the opposite side.

Figure 3 is a sectional view through a wheel and attachment in position, with parts in elevation and different positions shown in dotted lines.

Figure 4 is a perspective view of the clamping device when detached from the wheel.

Figure 5 is a plan view of the mud grip element detached.

A portion of the felly of an automobile wheel is indicated at A and the usual pneumatic tire is designated B. The mud gripping device 1 is shown detached in Figure 5, and is formed of suitable metal. It is wider at the end 2 than at the end 3 and has sides 4 which flare outwardly away from the tire. Longitudinally the device 1 is curved so that it will fit the ordinary tire as shown in Figure 3. Near each end the device 1 is provided with a hole 5 and by means of rivets 6 passing through these holes are attached short pieces of chain 7 and 8.

The mud grip 1 is adapted to be clamped into position by a device including a main member 9 which has a channel portion 10 and ends 11 and 12 bent at substantially right angles thereto, the channel portion 10 fitting over the felly A as shown in Figure 3, and the ends 11 and 12 lying close to the sides of the felly. Within the channel portion is fastened a strip of leather 13 or other suitable material by means of a rivet 14, and this strip engages the face of the felly when the device is in position.

The end portion 12 of the main member 9 is bent outwardly and its edges brought into parallelism to provide ears 15 between which a clamping lever 16 is pivoted on a bolt 17 which passes through said ears and lever. This lever has an outer curved end 18 and a pivot bolt 19 is passed through the lever intermediate its ends but much nearer the pivot 17 than the outer end. A large link 20 has ears 21 which fit around the pivot bolt 19 on each side of the lever. Carried by the link 20 is an open link 22 having its end 23 bent to one side and at an angle to the link so as to prevent accidental unhooking of this link from the chain 8 to which it is attached when in use.

The end portion 11 of the main member 9 is split and turned over to form two ears 24 between which is mounted a fingerpiece 25 having a hole 26 therein as shown. A pivot bolt 27 passes through the ears 24 which are of considerable extent, and through the fingerpiece 25, thus pivoting this fingerpiece between the ears 24 which form bushings for the bolt. The fingerpiece is twisted intermediate its end so that its outer end lies in a plane substantially at right angles to the plane of the pivoted end. A loop of wire 28 has its ends formed into eyes 29 through which passes the bolt 27 which is thus adapted to act as a pivot for the loop 28 as well as the finger piece 25. This bolt may be provided at its ends with washers if desired, and may be varied in its exact form by the substitution of a different form of bolt, it being necessary that the bolt provide a pivot for both the loop and the finger piece, and preferably that it turn freely in the ears or bushings 24. To the loop is fastened the chain 7 as shown.

When the parts are in the dotted line position of Figure 3, the chain 8 may be hooked over the open link 22, after which the lever 16 is moved from the dotted line to the full line position in which it lies nearly parallel with the member 10 and felly A. In this movement, the pivot 19 moves from dotted to full line position, and by such movement exerts a pull on the chain 8, thus clamping the mud grip 1 tightly against the tire B. When the lever 16 has reached the full line position, the fingerpiece 25 is moved to the right in Figure 3 from dotted line position to full line position in which movement the hole or slot 26 passes over the end 18 of the lever 16, the rounded cam end permitting it to be pushed readily into position. With the parts in full line position, it is obvious that the parts cannot become accidentally detached, since the pull on the parts will tend to hold them in latched position. The outer end of the lever 16 is provided with a hole 30 through which may be passed a suitable pin, wire link, or the like if desired which will prevent disengagement of the lever 16 and the finger piece 25.

It will be noted that I have provided a very simple attachment, in which the mud grip is a unitary member, the member 9 can be formed from one piece of metal, and the clamp lever 16 and locking fingerpiece 25 are both simple. Two pieces of chain connect the various elements, the peculiarly formed open link or hook 22 enabling ready detachment when the parts are loosened and preventing disengagement at any other time. The device can be readily applied at any time and as quickly detached when its use is no longer necessary. The gripping member 1 is of the most appropriate shape which affords a firm grip but does not readily become clogged. Being made of one piece it will stand heavy service and is found very efficient in operation. All of the parts of the device can be strongly made and the number of parts has been greatly reduced from my prior patent and from the usual devices of this character.

It is obvious that the form and material of the elements as well as their particular arrangement can be varied without departing from the spirit of the invention, and it is to be understood that the invention is limited only by the scope of the appended claims.

I claim as my invention:

1. A mud grip comprising a unitary metal plate curved from end to end and tapering from one end toward the other, said plate having its side edges flaring outwardly, whereby the grip will act effectively but will not become clogged.

2. A mud grip comprising a gripping member, a locking and clamping device which includes a channel shaped plate adapted to fit over the felly of an automobile wheel, the ends of said plate being formed into ears, a clamping lever pivoted between the ears at one end, and a cooperative latch member mounted between the ears at the other end, and means for connecting the gripping member and the locking device.

3. A mud grip comprising a gripping member, a locking and clamping device including a channel shaped plate adapted to fit over the felly of an automobile wheel, one end of said plate being divided and bent to form parallel ears, a clamping lever pivoted between said ears, the other end of said plate being slotted and bent to form tubular ears, a bolt passing therethrough, a cooperating latch member pivoted on said bolt between the tubular ears, and means for connecting the gripping member with the locking device.

4. A mud grip comprising a gripping member, an attaching device including a channel shaped plate adapted to fit over the felly of an automobile wheel, one end of the plate being divided and bent to form parallel ears, a clamping lever pivoted between said ears, means connected to said lever intermediate its ends and to one end of the gripping member, the other end of the plate being slotted and bent to form tubular bearings, a bolt passing through said bearings, a latch member adapted to cooperate with the lever and pivoted on the bolt, and means pivotally mounted on said bolt and detachably connected to the other end of the gripping member.

In testimony whereof I have hereunto subscribed my name.

VACLAV MIKULECKY.